United States Patent
Rule et al.

(10) Patent No.: US 12,293,074 B2
(45) Date of Patent: May 6, 2025

(54) MANAGING DATA ASSOCIATED WITH A USER-BASED STORAGE SITE

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 82 days.

(21) Appl. No.: 18/162,037

(22) Filed: Jan. 31, 2023

(65) Prior Publication Data

US 2024/0256121 A1 Aug. 1, 2024

(51) Int. Cl.
*G06F 3/06* (2006.01)
*H04L 67/52* (2022.01)

(52) U.S. Cl.
CPC .......... *G06F 3/0604* (2013.01); *H04L 67/52* (2022.05)

(58) Field of Classification Search
CPC .................................................. G06F 3/0604
See application file for complete search history.

(56) References Cited

U.S. PATENT DOCUMENTS

| | | | |
|---|---|---|---|
| 10,310,500 B1* | 6/2019 | Brady | G07C 9/00182 |
| 11,195,388 B1* | 12/2021 | Zalewski | G06Q 30/0635 |
| 2014/0015644 A1* | 1/2014 | Amann | G06F 16/00 340/10.1 |
| 2021/0272059 A1* | 9/2021 | Cartwright | G07F 17/12 |

* cited by examiner

*Primary Examiner* — Van H Oberly
(74) *Attorney, Agent, or Firm* — Harrity & Harrity, LLP

(57) ABSTRACT

In some implementations, a system may receive interaction data indicating an object and a user location associated with a user of a plurality of users. The system may identify a user-based storage site, of a plurality of user-based storage sites corresponding to at least a subset of the plurality of users, having an object list that includes the object. A particular user-based storage site, of the plurality of user-based storage sites, may have a storage site location associated with a corresponding user. The storage site location may be within a distance threshold of the user location. The system may transmit location data indicating the storage site location. The system may receive retrieval data indicating that the object has been retrieved from the user-based storage site. The system may update the object list of the user-based storage site.

20 Claims, 9 Drawing Sheets

MANAGING DATA ASSOCIATED WITH A USER-BASED STORAGE SITE

BACKGROUND

Data storage, such as a database, a table, a linked list, and/or the like, is an organized collection of data. A relational database is a collection of schemas, tables, queries, reports, views, and/or the like. Data storage designers typically organize the data storage to model aspects of reality in a way that supports processes requiring information. A data storage management system is a software application that interacts with users, other applications, and data storage to allow definition, creation, querying, updating, and/or administration of data storage.

SUMMARY

Some implementations described herein relate to a system for managing data associated with a user-based storage site. The system may include a management system having one or more memories and one or more processors communicatively coupled to the one or more memories. The one or more processors of the management system may be configured to receive interaction data indicating an object and a user location associated with a user of a plurality of users. The one or more processors of the management system may be configured to identify a user-based storage site, of a plurality of user-based storage sites corresponding to at least a subset of the plurality of users, having an object list that includes the object. A user-based storage site, of the plurality of user-based storage sites, may have a storage site location associated with a corresponding user of the at least a subset of the plurality of users. The storage site location may be within a distance threshold of the user location. The system may include a retrieval system having one or more memories and one or more processors communicatively coupled to the one or more memories. The one or more processors of the retrieval system may be configured to receive, from the management system, location data indicating the storage site location. The one or more processors of the retrieval system may be configured to transmit, to a storage site system of the user-based storage site, access data indicating one or more authenticators to gain access to the object.

Some implementations described herein relate to a method of managing data associated with a user-based storage site. The method may include receiving, by a system having one or more processors, interaction data indicating an object and a user location associated with a user of a plurality of users. The method may include identifying, by the system, a user-based storage site, of a plurality of user-based storage sites corresponding to at least a subset of the plurality of users, having an object list that includes the object, where a particular user-based storage site, of the plurality of user-based storage sites, has a storage site location associated with a corresponding user of the at least a subset of the plurality of users, and where the storage site location is within a distance threshold of the user location associated with the user. The method may include transmitting, by the system to a retrieval system, location data indicating the storage site location. The method may include receiving, by the system, retrieval data indicating that the object has been retrieved from the user-based storage site. The method may include updating, by the system, the object list of the user-based storage site.

Some implementations described herein relate to a non-transitory computer-readable medium that stores a set of instructions for a device. The set of instructions, when executed by one or more processors of the device, may cause the device to identify, for a particular user-based storage site, of a plurality of user-based storage sites corresponding to at least a subset of a plurality of users, a coverage region representing an area of coverage of coverage users, of the plurality of users, within a radius threshold of a storage site location associated with the particular user-based storage site. The storage site location may correspond to a user location associated with a particular user of the at least a subset of the plurality of users. The set of instructions, when executed by one or more processors of the device, may cause the device to determine one or more historical objects, associated with a plurality of historical interactions by the coverage users, that satisfy one or more conditions. The set of instructions, when executed by one or more processors of the device, may cause the device to assign one or more objects, corresponding to at least a subset of the one or more historical objects, to an object list associated with the particular user-based storage site based on one or more factors.

DETAILED DESCRIPTION

Figure 1A:
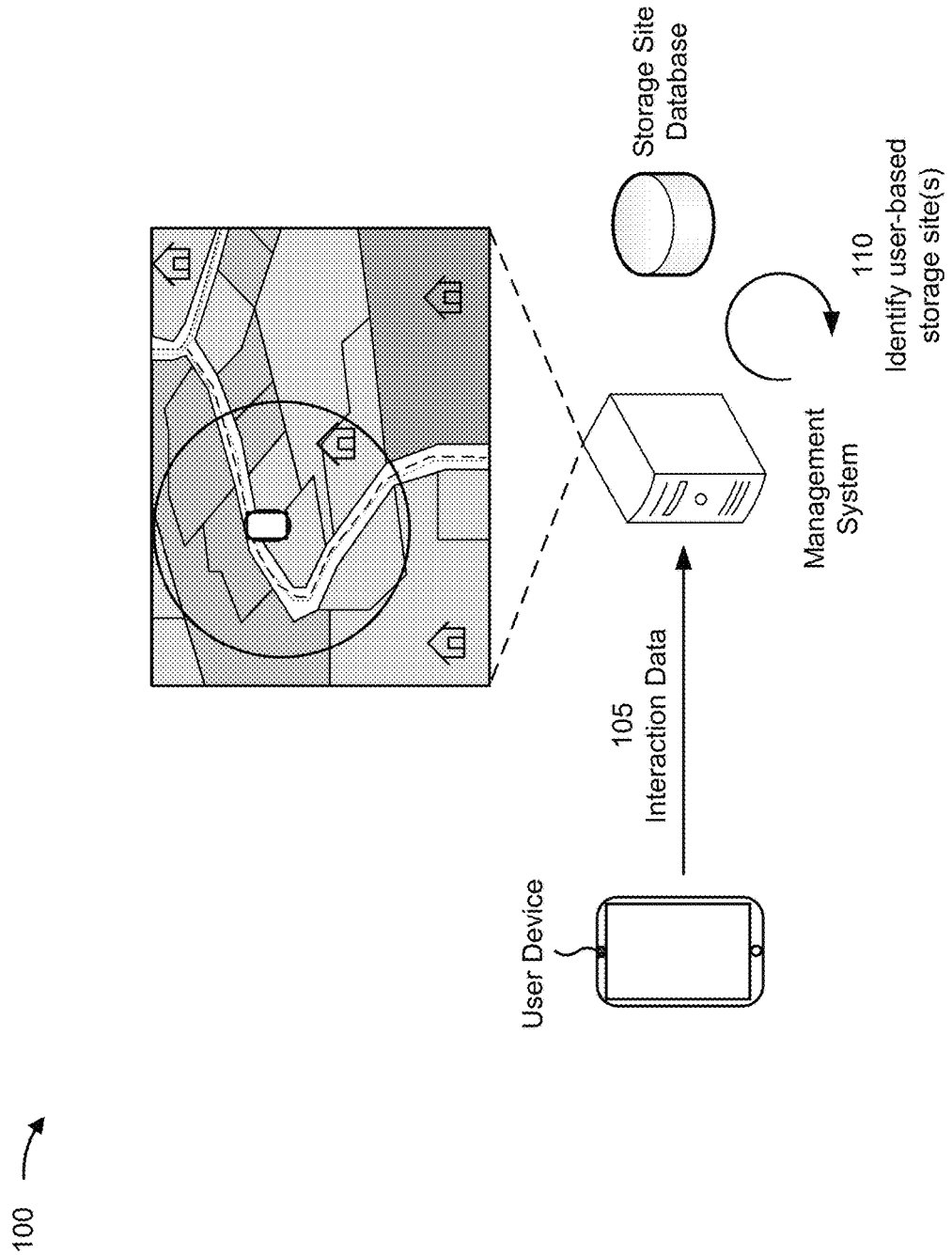
FIGS. 1A-1C are diagrams of an example associated with managing data associated with a user-based storage site, in accordance with some embodiments of the present disclosure.

The following detailed description of example implementations refers to the accompanying drawings. The same reference numbers in different drawings may identify the same or similar elements.

An entity may provide objects (e.g., materials, supplies, and/or products) to users from one or more different locations associated with the entity (e.g., warehouses or distribution centers). In some instances, the location(s) may store a wide variety and/or quantity of objects. Accordingly, a system of the entity may have to manage and/or process a large amount of data (e.g., object data corresponding to object or inventory lists) associated with a particular location, which may in turn, require a large amount of computing resources and/or network resources. Additionally, because a particular location may have a large size to accommodate the wide variety and/or quantity of objects, the location(s) may be few in quantity and spread out, and therefore, each location may cover a wide coverage area and number of users. As a result, the system may be required to further expend computing resources and/or network resources required to account for the large number of users and potentially further distances associated with coordinating transmission (e.g., delivery) of the objects to the users. Furthermore, the object data associated with a particular location may be independent of data associated with users (e.g., user data and/or interaction data corresponding to interactions by the users involving particular objects). As a result, the object data associated with the particular location may not be coordinated with the user/interaction data associated with the users within the coverage area of the particular location (e.g., the location may not have particular objects to transmit to the users), which may result in transmission inefficiencies (e.g., an object may be required to be transmitted to the user from a further location). Accordingly, it is desirable to have a system in which the data associated with a particular location is parsed down and/or tied to user data to efficiently use computing resources and/or networking resources to manage the data.

Some implementations described herein describe a system for managing data associated with a user-based storage site (e.g., a storage site having a location associated with the user, such as the user's home). Accordingly, the user-based storage site may have a smaller size and coverage area than a traditional storage site (e.g., warehouse), and therefore less data to manage. For example, the system may receive interaction data indicating an object and a user location associated with a user. The system may identify a user-based storage site having an object list that includes the object and that may be located within a distance threshold of the user location. The system may transmit the storage-site location to a retrieval system (e.g., a retrieval vehicle, which may include an autonomous vehicle, and/or a retrieval device). To gain access to the object at the user-based storage site, the retrieval system may transmit, to a storage site system of the user-based storage site, access data indicating one or more authenticators to gain such access.

In some implementations described herein, the system may determine objects to include in the object list associated with a particular user-based storage site based on historical interactions of users within a coverage region of the particular user-based storage site. For example, the system may determine historical objects from the historical interactions that satisfy one or more conditions (e.g., interaction quantity threshold, object quantity threshold, time of year). The system may then assign such objects to the object list of the particular user-based storage site based on one or more factors (e.g., size of the object, quantity of the object, capacity of the user-based storage site).

In this way, for a particular user-based storage site, the system may have a parsed down set of data to manage and process by the nature of a smaller size associated with the user-based storage, thereby conserving computing resources and/or network resources. Additionally, by having a smaller coverage region and potential number of users to service, the set of data may be additionally parsed down, thereby further conserving computing resources and/or network resources. Furthermore, the system may associate the data with interaction data of users within the coverage region of the particular user-based storage site, which therefore may be more likely to have an object associated with an interaction by a coverage user. As a result, the system may be able to focus the management and processing of the parsed-down set of data of the particular user-based storage site (e.g., not have to include the data of other user-based storage sites), thereby efficiently utilizing computing and network resources.

Figure 1B:
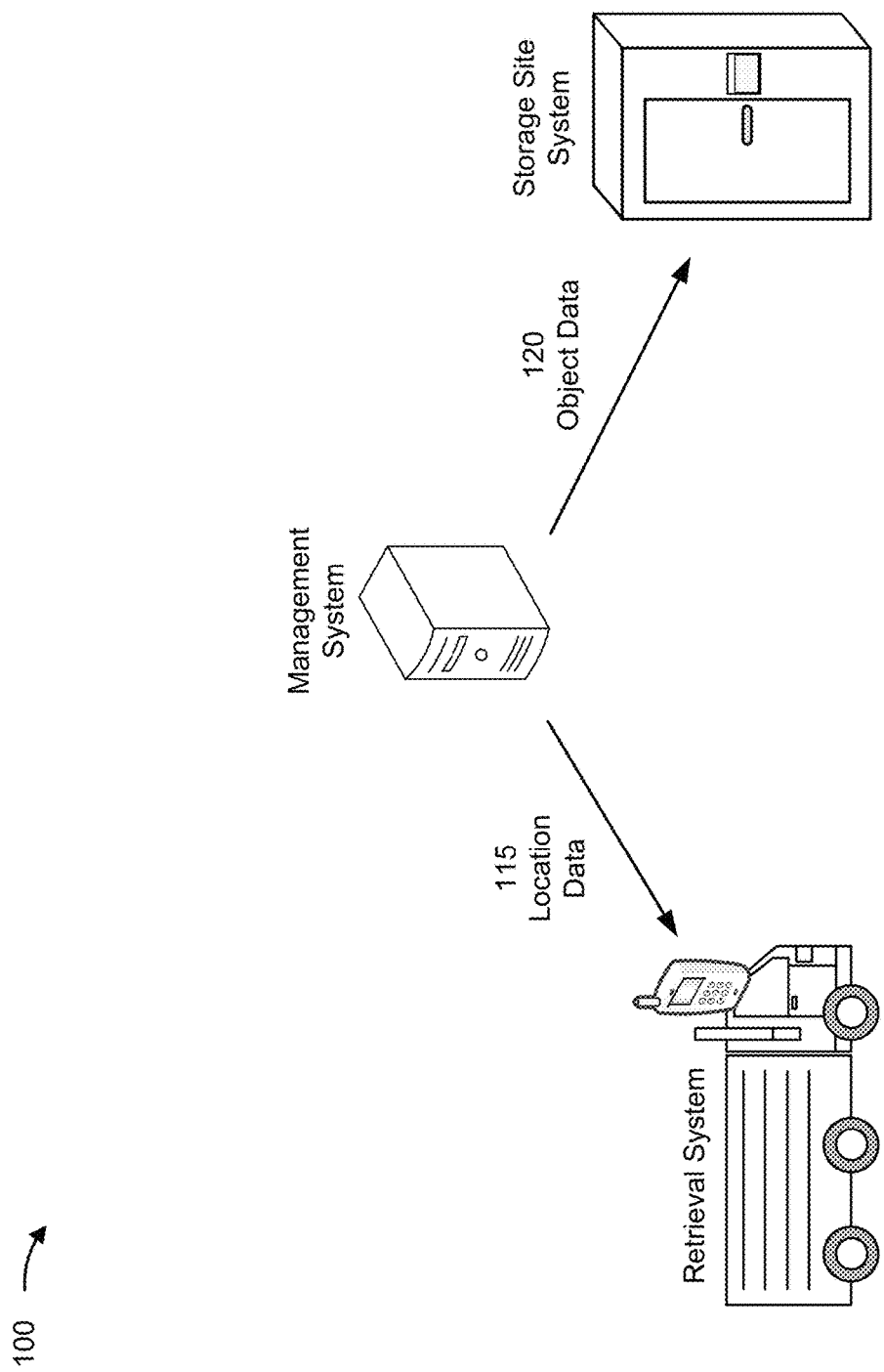
Figure 1C:
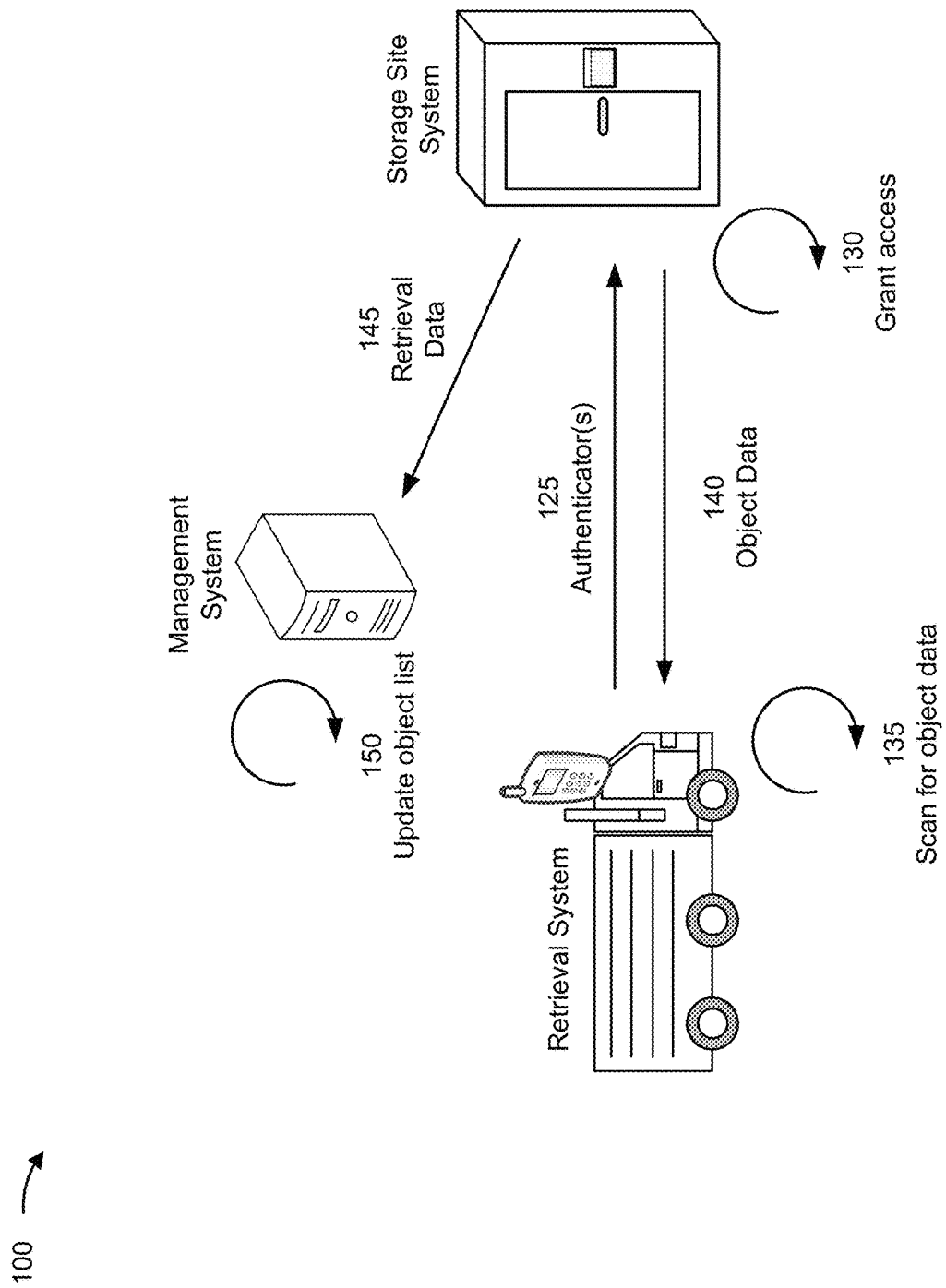

FIGS. 1A-1C are diagrams of an example 100 associated with managing data associated with a user-based storage site. As shown in FIGS. 1A-1C, example 100 includes a management system, a user device, a storage site database, a storage site system, and a retrieval system. These devices are described in more detail in connection with FIGS. 3 and 4.

As shown in FIG. 1A, a user may engage in an interaction (e.g., a transaction) with an entity or interaction party (e.g., a merchant, a vendor, or a service provider). The user may remotely perform the interaction via the user device of the user, such as in an online interaction. As shown by reference number 105, the management system may receive interaction data associated with the user device interactions. The interaction data may be received from the user device and/or any intermediate devices (not shown) associated with the interactions (e.g., a payment server). The interaction data may indicate an object (e.g., a product) associated with the interaction, an object quantity associated with the interaction, and/or a user location associated with the user.

As shown by reference number 110, the management system may identify a user-based storage site, from one or more user-based storage sites corresponding to one or more users, that has an object list (e.g., an inventory) that includes the object. A user-based storage site is a storage site at which one or more objects are stored for access at a later time and that may have a storage site location (e.g., geographic location and/or address) associated with a corresponding user, such as at a home, garage, and/or a workplace of the corresponding user. A particular user-based storage site may have a coverage region representing an area of coverage of coverage users (e.g., users performing the interactions) that may have corresponding user locations within a radius threshold (e.g., 5 miles, 10 miles, or 25 miles) of the storage site location. The management system may identify the user-based storage site from a storage site database in which storage site data (e.g., object lists, storage site locations, and/or coverage regions), corresponding to multiple user-based storage sites, may be stored.

The management system may identify the user-based storage site location based on the user location. For example, the management system may identify the user-based storage site as having a storage site location located within a distance threshold (e.g., 5 miles, 10 miles, or 25 miles) of the user location. Additionally, or alternatively, the management system may identify which coverage region is associated with the user location, and may identify the user-based site location based on the coverage region.

As shown in FIG. 1B, the management system may correspond with a retrieval system and a storage site system associated with the user-based storage site to coordinate retrieval of the object(s) associated with the interaction. The storage site system may include a storage area or space (e.g., one or more lockers, a shed, and/or a garage), and an access device for granting access to the storage area or space. For example, the access device may include an automated locking system that reads, scans, and/or processes an authenticator, and grants access to the storage area or space upon confirming the authenticator, as described in more detail below in connection with FIG. 1C. The retrieval system may include a device that provides the authenticator. In some implementations, the retrieval system may include an autonomous vehicle (e.g., a drone or an autonomous ear), such that retrieval of the object may be automated. As shown by reference number 115, the management system may transmit, and the retrieval system may receive, location data indicating the user location of the user associated with the interaction. As shown by reference number 120, the management system may transmit, and the storage site system may receive, object data indicating the object(s) associated with the interaction and/or a corresponding quantity. In some implementations, the management system may coordinate timing of the retrieval with the retrieval system. For example, the management system may have access to schedule data associated with the retrieval system and with the storage site system, and may schedule the retrieval accordingly. Alternatively, the retrieval system and the storage site system may communicate independently of the management system to coordinate the retrieval.

As shown in FIG. 1C, the retrieval system and the storage site system may interact to enable retrieval of the object(s) associated with the interaction. As shown by reference number 125, the retrieval system may provide one or more authenticator(s) to the storage site system. The authenticator may grant general access to the storage area or space, or the authenticator may be dedicated to the particular interaction. For example, an authenticator may be a comparison object list of objects and/or quantity of objects associated with the interaction or generally with the user-based storage site, which the retrieval system may transmit to the storage site system. The storage site system may compare the comparison object list with the object data and/or the object list associated with the user-based storage site. If the comparison object list matches within a matching threshold (e.g., 90%, 95%, or 100% accurate), then the storage site system may grant access to the storage area or space (e.g., by unlocking a door). If the comparison object list does not match within the matching threshold, then the storage site system may deny access to the retrieval system. Additionally, or alternatively, an authenticator may be or may include an authentication token, such as a bar code, a QR code, or the like. As shown by reference number 130, the storage site system may grant access to the retrieval system upon authentication via the authenticator(s).

In some implementations, as shown by reference number 135, the retrieval system may scan a tag (e.g., a bar code or a QR code) located at the user-based storage site for object data indicating the object(s) to be retrieved. As shown by reference number 140, the storage site system may transmit, and the retrieval system may receive, the object data. Additionally, or alternatively, the storage system may automatically transmit the object data upon authentication via the authenticator(s). Additionally, or alternatively, the retrieval system may already have the object data (e.g., from the management system). As shown by reference number 145, upon retrieval of the object(s), the storage site system may transmit, and the management system may receive, retrieval data indicating retrieval of the object(s). Additionally, or alternatively, the retrieval system may transmit the retrieval data to the management system. As shown by reference number 150, the management system may update the object list of the user-based storage system.

As described above, the system may manage and process data associated with a user-based storage site and an interaction by a user. By the nature of a user-based storage site having a smaller footprint and capacity as a traditional storage center (e.g., a warehouse), the system may have less data associated with the user-based storage site to manage and process. As a result, the system may be able to more efficiently utilize computing resources and/or network resources to manage and process data associated with the user-based storage site and/or interactions by users.

As indicated above, FIGS. 1A-1C are provided as an example. Other examples may differ from what is described with regard to FIGS. 1A-1C.

Figure 2A:
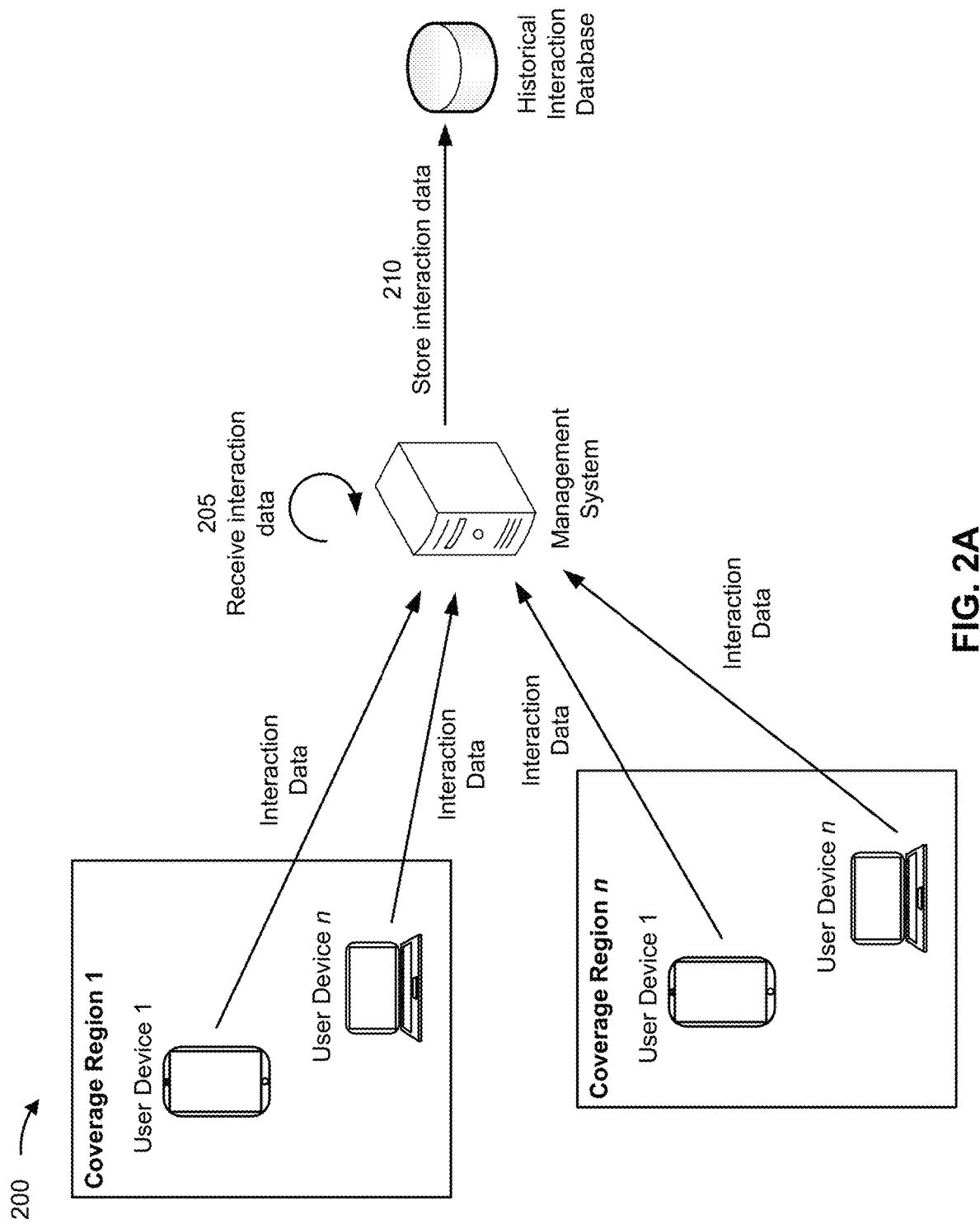
FIGS. 2A and 2B are diagrams of an example associated with managing data associated with a user-based storage site, in accordance with some embodiments of the present disclosure.
Figure 2B:
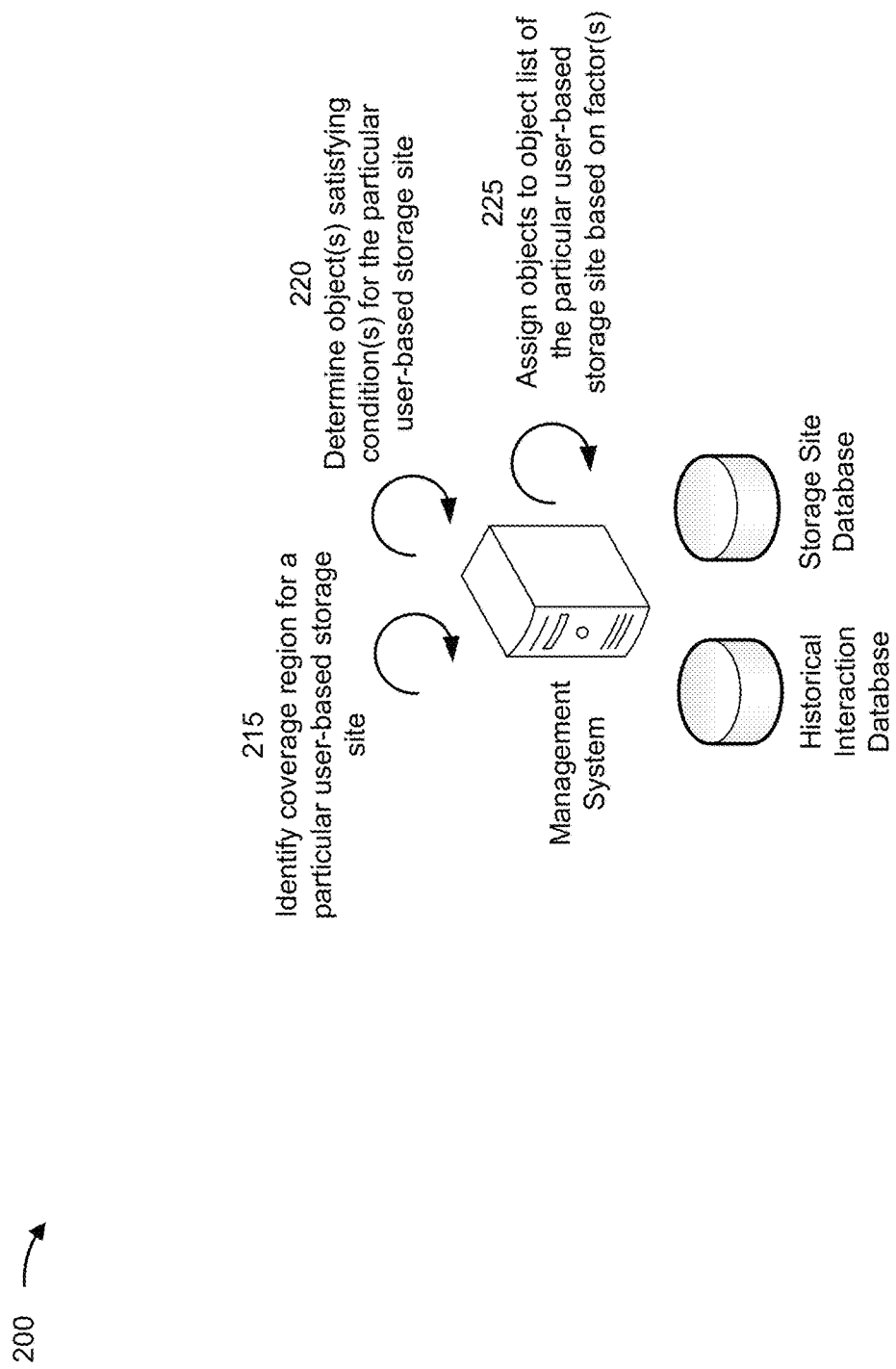

FIGS. 2A and 2B are diagrams of an example 200 associated with managing data associated with a user-based storage site. As shown in FIGS. 2A and 2B, example 200 includes multiple user devices, a management system, a historical interaction database, and a storage site database. These devices are described in more detail in connection with FIGS. 3 and 4.

As shown in FIG. 2A, various users may perform interactions via their respective user devices (e.g., in online interactions). The users may be associated with coverage regions of respective user-based storage sites. A user-based storage site may be a storage site in which one or more objects may be stored and accessed at a later date in association with an interaction by a user. The user-based storage site may have a storage site location associated with a corresponding user, which may be different from the user performing the interaction, such as a house of the corresponding user. The coverage region of a particular user-based storage site may represent an area of coverage of users (also referred to as coverage users) who may perform the interactions and who are within a radius threshold of the storage site location.

As shown by reference number 205, the management system may receive interaction data associated with the interactions by the different users. The interaction data may be received by the management system from the user device and/or from any intermediate devices (not shown) associated with the interactions (e.g., a payment server). As described above with respect to example 100, the interaction data associated with a particular interaction may include an object associated with the particular interaction and/or a user location associated with the user performing the particular interaction. As shown by reference number 210, the management system may store the interaction data as historical interaction data corresponding to historical interactions (e.g., in a historical interaction database), which the management system may access to manage data associated with a particular user-based storage site (e.g., an object list). The historical interaction data may be associated with a corresponding coverage region and/or user-based storage site associated with the historical interactions.

As shown in FIG. 2B, and by reference number 215, the management system may identify, for a particular user-based storage site, the coverage region corresponding to the particular user-based storage site. As shown by reference number 220, the management system may determine, for the particular user-based storage site and based on the historical interaction data associated with historical interactions of users within the coverage region, one or more objects (also referred to as historical objects) associated with the historical interactions that satisfy one or more conditions. In some implementations, one condition may be that the historical interactions associated with a particular historical object exceeds an interaction quantity threshold. For example, if the interaction quantity threshold is five interactions, and the number of historical interactions that include a particular historical object (e.g., toilet paper) is six, then the management system may determine that the particular historical object paper satisfies the condition. Conversely, if the number of historical interactions that include another historical object (e.g., tissues) is four, then the management system may determine that the other historical object does not satisfy the condition. The condition may be based on an object type of the historical object, a brand of the historical object, and/or a model number of the historical object. Additionally, or alternatively, the condition may be based on a time frame threshold (e.g., within the past 3 months, 6 months, or year). For example, if two of the six interactions for the particular historical object in the example above occurred more than a year ago, and the time frame threshold is one year, then the management system may determine that the particular historical object does not satisfy the condition.

Additionally, or alternatively, another condition may be that an object quantity of a particular historical object exceeds an object quantity threshold. For example, if the object quantity threshold is five, and one historical interaction included a quantity of six of the particular historical object, then the management system may determine that the particular historical object satisfies the condition. As another example, if the object quantity threshold is five, and one interaction included a quantity of three of the particular historical object, and a second interaction included a quantity of three of the particular historical object, then the management system also may determine that the particular historical object satisfies the condition. The condition may be based on an object type of the historical object, a brand of the historical object, and/or a model number of the historical object. Additionally, or alternatively, the condition may be based on a time frame threshold (e.g., within the past 3 months, 6 months, or year). For example, if one of the two interactions with an object quantity of three of the particular historical object in the example above occurred within the past year, but the other of the two interactions with the object quantity of three of the particular historical object occurred more than one year ago, then the management system may determine that the particular historical object does not satisfy the condition.

As shown by reference number 225, the management system may assign, based on a determination that one or more historical objects satisfy one or more conditions, one or more historical objects to an object list associated with the particular user-based storage site (e.g., add the object(s) to the inventory of the user-based storage site) based on one or more factors. In some implementations, the factor(s) may include respective sizes associated with the object(s), respective quantities associated with the object(s), and/or capacity associated with the particular user-based storage site. Additionally, or alternatively, the factor(s) may include the present time of year and/or the geographic location of the user-based storage site. For example, if the time of year is within a time frame threshold of Christmas (e.g., 3 months before Christmas), then objects associated with Easter may not be added to the object list. As another example, if the time of year is winter and the geographic location of the user-based storage site is in a colder climate, then bathing suits may not be added to the object list.

In some implementations, the management system may determine, for a particular user-based storage site, that an object count, associated with a particular object in the object list of the particular user-based storage site, satisfies a threshold amount. The threshold amount may be based on the historical interaction data, as described above. If the management system determines that the object count is less than the threshold amount, then the management system may transmit, to user devices of users, a message requesting a quantity of the particular object to supply to the object list of the particular user-based storage site. The users may be coverage users associated with the coverage region of the particular user-based storage site.

In some implementations, the user associated with the user-based storage site may supplement the object list (e.g., with one or more used objects). In such implementations, the management system may receive, from a user device associated with a particular user, object data indicating the used object(s). The management system may subsequently update the object list with the user object(s).

As described above, the system may enable object data associated with a particular user-based storage site to relate to the interaction data associated with the users within the coverage region of the particular user-based storage site. In this way, in addition to having parsed down data by the nature of a smaller size associated with the user-based storage as described above with respect to example 100, the user-based storage site is more likely to have an object associated with an interaction by a coverage user, and therefore, for a particular interaction, the system may focus the management and processing of data associated with the particular user-based storage site (e.g., not have to include the data of other user-based storage sites), thereby efficiently utilizing computing and network resources.

As indicated above, FIGS. 2A and 2B are provided as an example. Other examples may differ from what is described with regard to FIGS. 2A and 2B.

Figure 3:
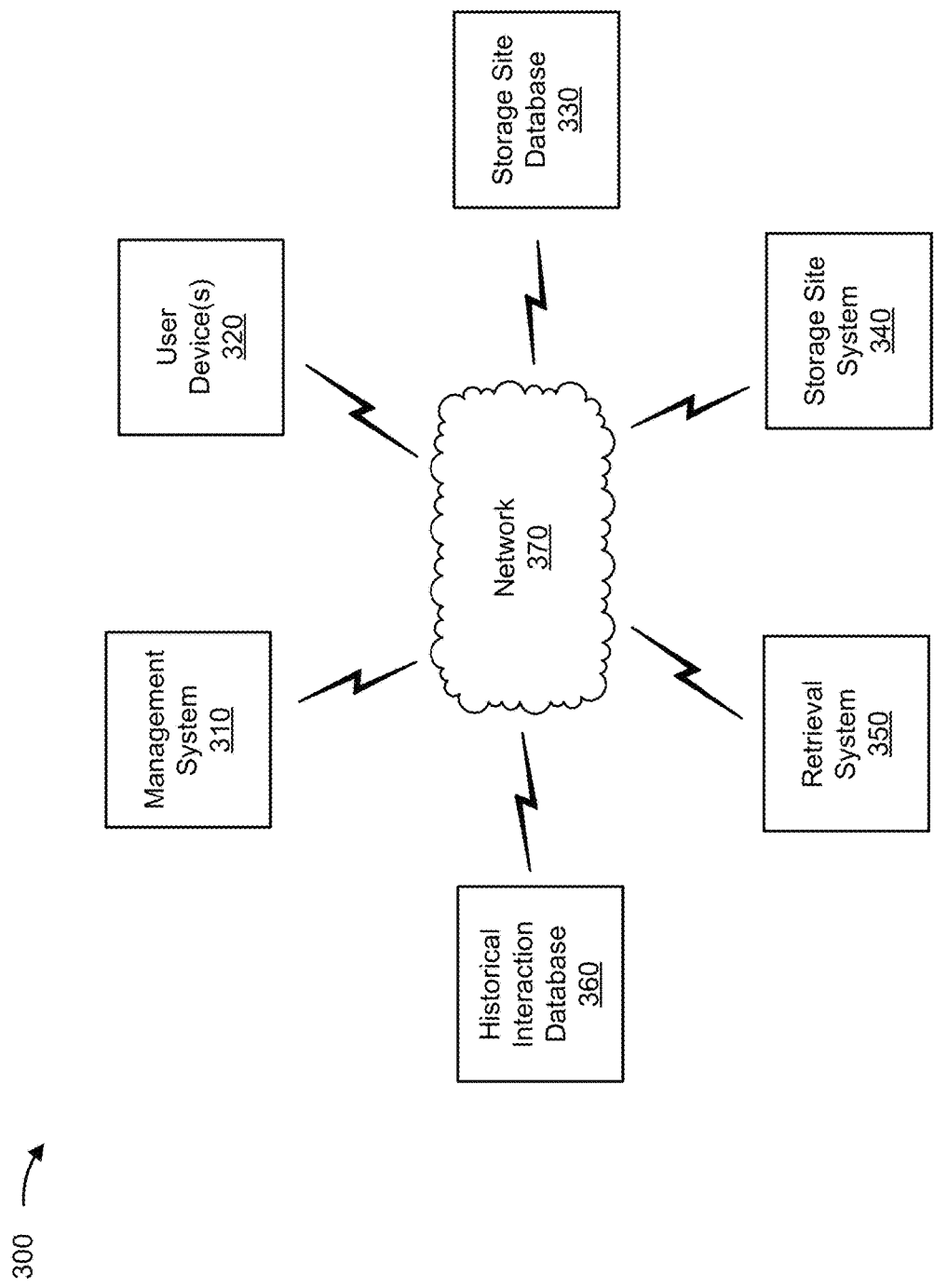
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a management system 310, one or more user devices 320, a storage site database 330, a storage site system 340, a retrieval system 350, a historical interaction database 360, and a network 370. Devices of environment 300 may interconnect via wired connections, wireless connections, or a combination of wired and wireless connections.

The management system 310 may include one or more devices capable of receiving, generating, storing, processing, providing, and/or routing information associated with managing data associated with a user-based storage site, as described elsewhere herein. The management system 310 may include a communication device and/or a computing device. For example, the management system 310 may include a server, such as an application server, a client server, a web server, a database server, a host server, a proxy server, a virtual server (e.g., executing on computing hardware), or a server in a cloud computing system. In some implementations, the management system 310 may include computing hardware used in a cloud computing environment.

The user device(s) 320 may include one or more devices capable of receiving, generating, storing, processing, and/or providing information associated with managing data associated with a user-based storage site, as described elsewhere herein. The user device(s) 320 may include a communication device and/or a computing device. For example, the user device(s) 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The storage site database 330 may include one or more devices capable of receiving, generating, storing, processing, and/or providing information associated with managing data associated with a user-based storage site, as described elsewhere herein. The storage site database 330 may include a communication device and/or a computing device. For example, the storage site database 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the storage site database 330 may store information associated with the various storage sites, such as geographic locations and object lists, as described elsewhere herein.

The storage site system 340 may include one or more devices capable of receiving, generating, storing, processing, providing, and/or routing information associated with managing data associated with a user-based storage site, as described elsewhere herein. The storage site system 340 may include a communication device and/or a computing device. For example, the storage site system 340 may include a server, such as an application server, a client server, a web server, a database server, a host server, a proxy server, a virtual server (e.g., executing on computing hardware), or a server in a cloud computing system. In some implementations, the storage site system 340 may include computing hardware used in a cloud computing environment.

The retrieval system 350 may include one or more devices capable of receiving, generating, storing, processing, providing, and/or routing information associated with managing data associated with a user-based storage site, as described elsewhere herein. The retrieval system 350 may include a communication device and/or a computing device. For example, the retrieval system 350 may include a server, such as an application server, a client server, a web server, a database server, a host server, a proxy server, a virtual server (e.g., executing on computing hardware), or a server in a cloud computing system. In some implementations, the retrieval system 350 may include computing hardware used in a cloud computing environment.

The historical interaction database 360 may include one or more devices capable of receiving, generating, storing, processing, and/or providing information associated with managing data associated with a user-based storage site, as described elsewhere herein. The historical interaction database 360 may include a communication device and/or a computing device. For example, the historical interaction database 360 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the historical interaction database 360 may store information associated with historical interactions of various users, such as dates of historical interactions, historical objects associated with historical interactions, historical object quantities associated with the historical objects and/or historical interactions, etc., as described elsewhere herein.

The network 370 may include one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 may enable communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
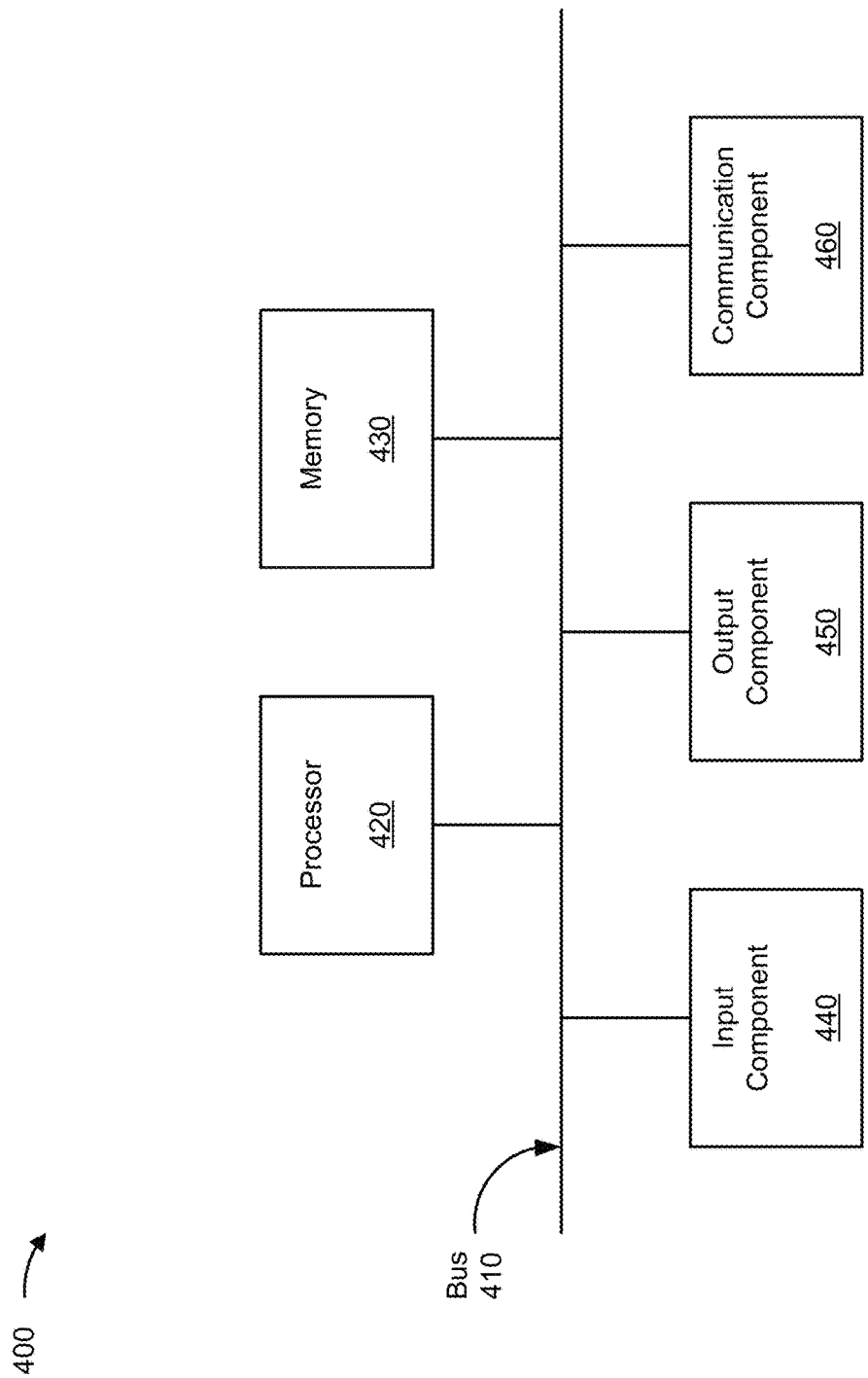
FIG. 4 is a diagram of example components of a device associated with managing data associated with a user-based storage site, in accordance with some embodiments of the present disclosure.

FIG. 4 is a diagram of example components of a device 400 associated with managing data associated with a user-based storage site. The device 400 may correspond to the management system 310, the user device(s) 320, the storage site database 330, the storage site system 340, the retrieval system 350, and/or the historical interaction database 360. In some implementations, the management system 310, the user device(s) 320, the storage site database 330, the storage site system 340, the retrieval system 350, and/or the historical interaction database 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
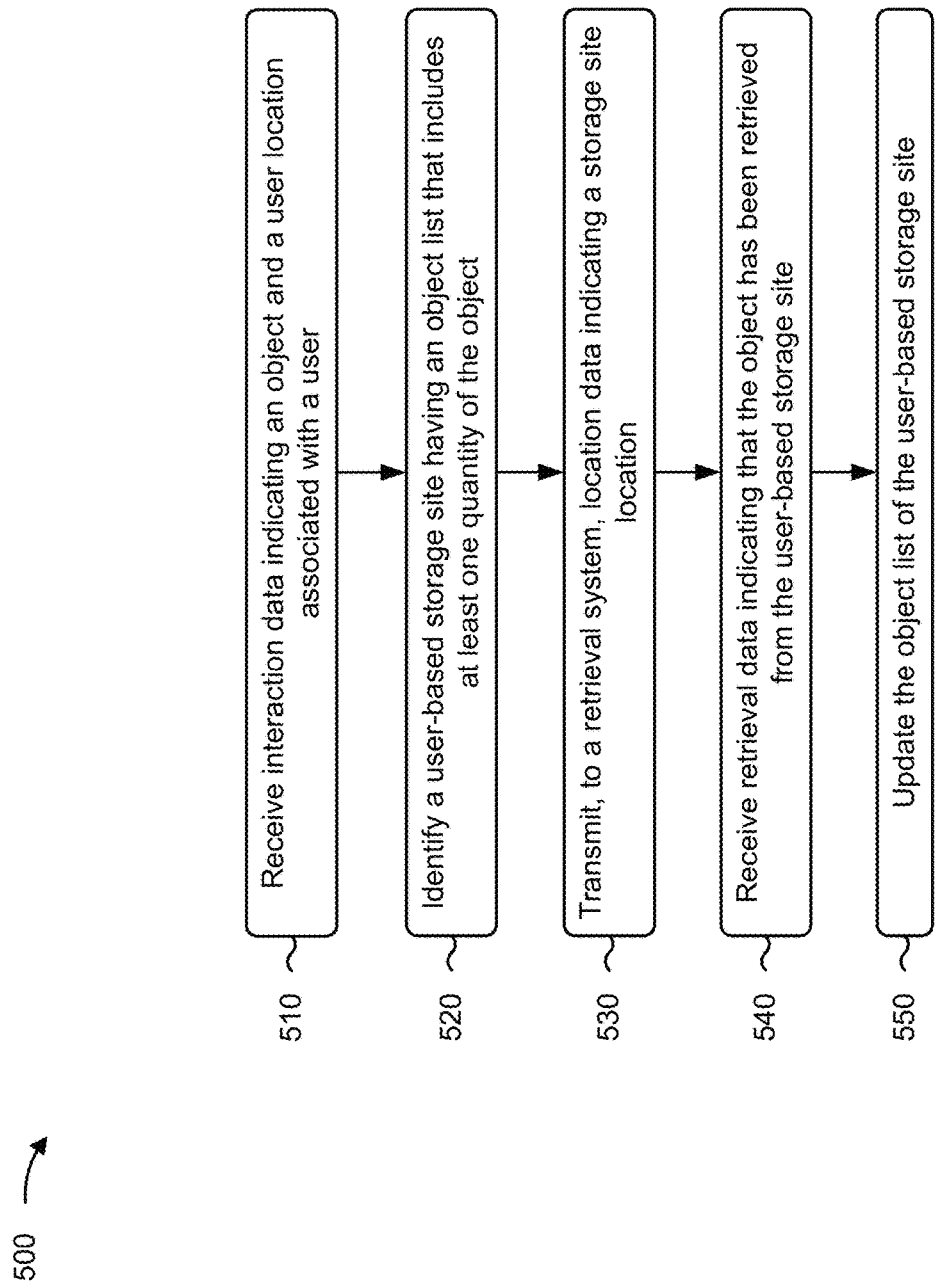
FIG. 5 is a flowchart of an example process associated with managing data associated with a user-based storage site, in accordance with some embodiments of the present disclosure.

FIG. 5 is a flowchart of an example process 500 associated with managing data associated with a user-based storage site. In some implementations, one or more process blocks of FIG. 5 may be performed by the management system 310. In some implementations, one or more process blocks of FIG. 5 may be performed by another device or a group of devices separate from or including the management system 310, such as the storage site system 340 and/or the retrieval system 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving interaction data indicating an object and a user location associated with the user (block 510). For example, the management system 310 (e.g., using processor 420, memory 430, input component 440, and/or communication component 460) may receive, from a user device associated with a user, of a plurality of users, interaction data indicating an object and a user location associated with the user, as described above in connection with reference number 105 of FIG. 1A.

As further shown in FIG. 5, process 500 may include identifying a user-based storage site having an object list that includes the object (block 520). For example, the management system 310 (e.g., using processor 420 and/or memory 430) may identify a user-based storage site, of a plurality of user-based storage sites corresponding to at least a subset of the plurality of users, having an object list that includes the object, wherein a particular user-based storage site, of the plurality of user-based storage sites, has a storage site location associated with a corresponding user of the at least a subset of the plurality of users, and wherein the storage site location is within a distance threshold of the user location associated with the user, as described above in connection with reference number 110 of FIG. 1A.

As further shown in FIG. 5, process 500 may include transmitting, to a retrieval system, location data indicating a storage site location (block 530). For example, the management system 310 (e.g., using processor 420, memory 430, and/or communication component 460) may transmit location data, to a retrieval system, indicating the storage site location, as described above in connection with reference number 115 of FIG. 1B.

As further shown in FIG. 5, process 500 may include receiving retrieval data indicating that the object has been retrieved from the user-based storage site (block 540). For example, the management system 310 (e.g., using processor 420, memory 430, input component 440, and/or communication component 460) may receive retrieval data indicating that the object has been retrieved from the user-based storage site, as described above in connection with reference number 145 of FIG. 1C.

As further shown in FIG. 5, process 500 may include updating the object list of the user-based storage site (block 550). For example, the management system 310 (e.g., using processor 420 and/or memory 430) may update the object list of the user-based storage site, as described above in connection with reference number 150 of FIG. 1C.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
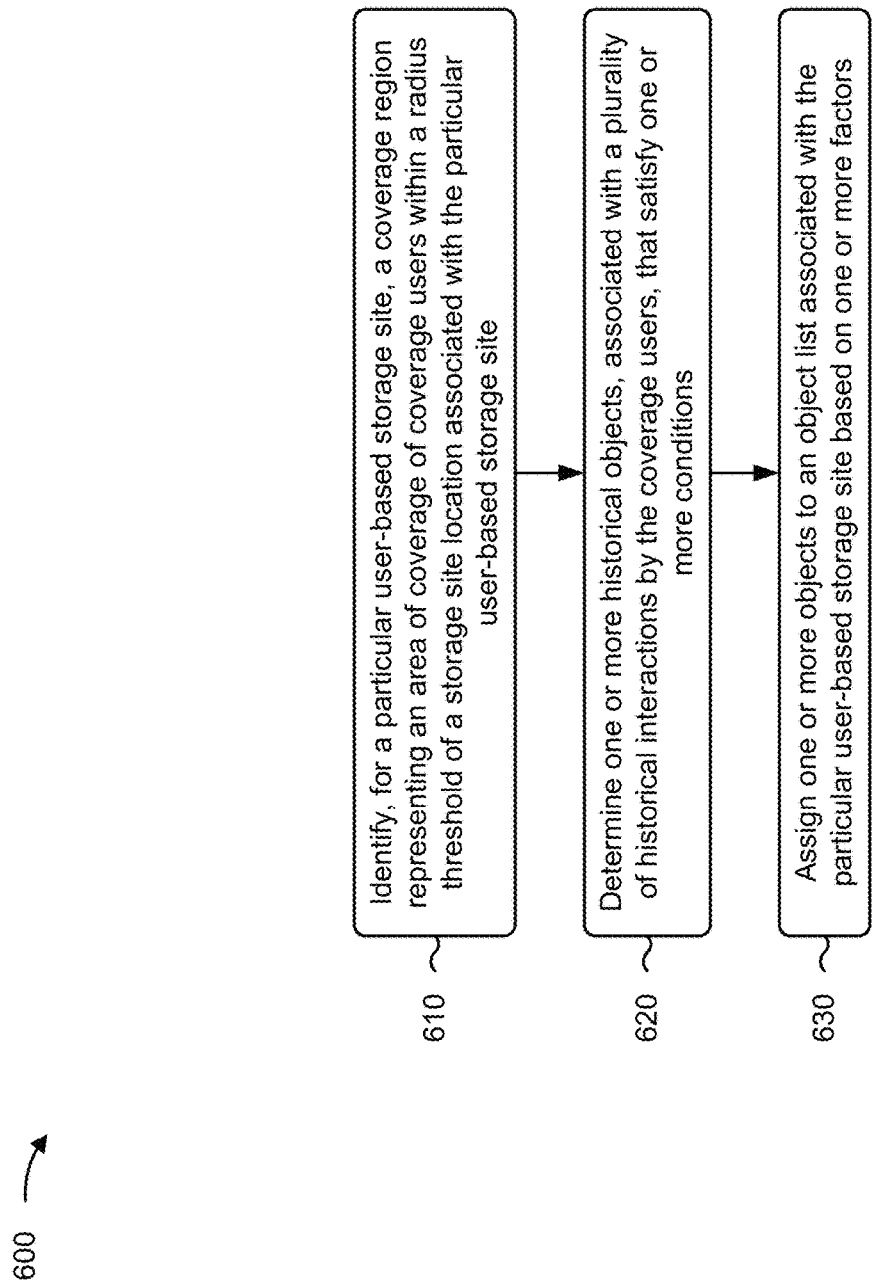
FIG. 6 is a flowchart of an example process associated with managing data associated with a user-based storage site, in accordance with some embodiments of the present disclosure.

FIG. 6 is a flowchart of an example process 600 associated with managing data associated with a user-based storage site. In some implementations, one or more process blocks of FIG. 6 may be performed by the management system 310. In some implementations, one or more process blocks of FIG. 6 may be performed by one or more components of the device 400, such as processor 420, memory 430, input component 440, output component 450, and/or communication component 460.

As shown in FIG. 6, process 600 may include identifying, for a particular user-based storage site, a coverage region representing an area of coverage of coverage users within a radius threshold of a storage site location associated with the particular user-based storage site (block 610). For example, the management system 310 (e.g., using processor 420 and/or memory 430) may identify, for a particular user-based storage site, of a plurality of user-based storage sites corresponding to at least a subset of a plurality of users, a coverage region representing an area of coverage of coverage users, of the plurality of users, within a radius threshold of a storage site location associated with the particular user-based storage site, wherein the storage site location corresponds to a user location associated with a particular user of the at least a subset of the plurality of users, as described above in connection with reference number 215 of FIG. 2B.

As further shown in FIG. 6, process 600 may include determining one or more historical objects, associated with a plurality of historical interactions by the coverage users, that satisfy one or more conditions (block 620). For example, the management system 310 (e.g., using processor 420 and/or memory 430) may determine one or more historical objects, associated with a plurality of historical interactions by the coverage users, that satisfy one or more conditions, as described above in connection with reference number 220 of FIG. 2B.

As further shown in FIG. 6, process 600 may include assigning one or more objects, corresponding to at least a subset of the one or more historical objects, to an object list associated with the particular user-based storage site based on one or more factors (block 630). For example, the management system 310 (e.g., using processor 420 and/or memory 430) may assign one or more objects, corresponding to at least a subset of the one or more historical objects, to an object list associated with the particular user-based storage site based on one or more factors, as described above in connection with reference number 225 of FIG. 2B.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 2A and 2B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for managing data associated with a user-based storage site, the system comprising:
 a management system that includes:
  one or more memories; and
  one or more processors, communicatively coupled to the one or more memories, configured to:
   receive interaction data of a transaction between a user and an interaction party,
    wherein the interaction data indicates an object and a user location associated with the user;
   identify a user-based storage site, of a plurality of user-based storage sites, that has the object,
    wherein each of the plurality of user-based storage sites is a physical site at which one or more objects are stored and has a storage site location that is associated with a home or a garage of a corresponding user, and
    wherein the user-based storage site is identified based on the storage site location being within a distance threshold of the user location; and
 a retrieval system that includes:
  one or more memories; and one or more processors, communicatively coupled to the one or more memories, configured to:
receive, from the management system, location data indicating the storage site location; and
transmit, to a storage site system of the user-based storage site, access data indicating one or more authenticators to gain access to the object,
wherein the one or more authenticators include a comparison list of additional objects at the user-based storage site, and
wherein access is granted to the object based on the comparison list matching an object list of the user-based storage site.

2. The system of claim 1, wherein the one or more processors, of the management system, are further configured to:
identify, for a particular user-based storage site, a coverage region representing an area of coverage of coverage users within a radius threshold of the storage site location;
determine one or more historical objects, associated with a plurality of historical interactions of the coverage users, that satisfy one or more conditions; and
assign one or more objects, corresponding to at least a subset of the one or more historical objects, to the object list of the particular user-based storage site.

3. The system of claim 2, wherein a condition, of the one or more conditions, is that the plurality of historical interactions associated with a particular historical object, of the one or more historical objects, exceeds an interaction quantity threshold.

4. The system of claim 2, wherein a condition, of the one or more conditions, is that an object quantity of a particular historical object, of the one or more historical objects, exceeds an object quantity threshold.

5. The system of claim 1,
wherein access is granted to the object if the comparison list matches, within a threshold, the object list.

6. The system of claim 1, wherein an authenticator, of the one or more authenticators, is an authentication token.

7. The system of claim 1, wherein the retrieval system includes an autonomous vehicle.

8. The system of claim 1, wherein the one or more processors, of the retrieval system, are further configured to:
scan a tag associated with the user-based storage site; and
receive, from the storage site system, object data indicating the object and a quantity associated with the object.

9. A method of managing data associated with a user-based storage site, comprising:
receiving, by a system having one or more processors, interaction data of a transaction between a user and an interaction party,
wherein the interaction data indicates an object and a user location associated with the user;
identifying, by the system, a user-based storage site, of a plurality of user-based storage sites, that has the object,
wherein each of the plurality of user-based storage sites is a physical site at which one or more objects are stored has a storage site location and that is associated with a corresponding user, and
wherein the user-based storage site is identified based on the storage site location being within a distance threshold of the user location associated with the user;
transmitting, by the system to a retrieval system, location data indicating the storage site location;
receiving, by the system, retrieval data indicating that the object has been retrieved from the user-based storage site based on one or more authenticators that include a comparison list of additional objects at the user-based storage site,
wherein access is granted to the object based on the comparison list matching an object list of the user-based storage site; and
updating, by the system, the object list.

10. The method of claim 9, further comprising:
identifying, for a particular user-based storage site, a coverage region representing an area of coverage of coverage users within a radius threshold of the storage site location;
determining one or more historical objects, associated with a plurality of historical interactions of the coverage users, that satisfy one or more conditions; and
assigning one or more objects, corresponding to at least a subset of the one or more historical objects, to the object list of the particular user-based storage site.

11. The method of claim 10, wherein a condition, of the one or more conditions, is that the plurality of historical interactions associated with a particular historical object, of the one or more historical objects, exceeds an interaction quantity threshold.

12. The method of claim 10, wherein a condition, of the one or more conditions, is that an object quantity of a historical object, of the one or more historical objects, exceeds an object quantity threshold.

13. A non-transitory computer-readable medium storing a set of instructions, the set of instructions comprising:
one or more instructions that, when executed by one or more processors of a device, cause the device to:
identify, for a particular user-based storage site of a plurality of user-based storage sites, a coverage region representing an area of coverage of coverage users within a radius threshold of a storage site location associated with the particular user-based storage site,
wherein each of the plurality of user-based storage sites is a physical site at which one or more objects are stored and is associated with a home or a garage of a corresponding user, and
wherein the particular user-based storage site is accessed based on an authenticator, including a comparison list of objects, matching an object list of the user-based storage site;
determine one or more historical objects, associated with a plurality of historical interactions by the coverage users, that satisfy one or more conditions; and
assign one or more objects, corresponding to at least a subset of the one or more historical objects, to the object list based on one or more factors.

14. The non-transitory computer-readable medium of claim 13, wherein a condition, of the one or more conditions, is that the plurality of historical interactions associated with a particular historical object, of the one or more historical objects, exceeds an interaction quantity threshold.

15. The non-transitory computer-readable medium of claim 13, wherein a condition, of the one or more conditions, is that an object quantity of a historical object, of the one or more historical objects, exceeds an object quantity threshold.

16. The non-transitory computer-readable medium of claim 13, wherein a factor, of the one or more factors, includes sizes associated with the one or more objects.

17. The non-transitory computer-readable medium of claim 13, wherein a factor, of the one or more factors, includes a capacity associated with the particular user-based storage site.

18. The non-transitory computer-readable medium of claim 13, wherein a factor, of the one or more factors, includes a time of year.

19. The non-transitory computer-readable medium of claim 13, wherein the one or more instructions, when executed by the one or more processors, further cause the device to:
   determine, for the particular user-based storage site, that an object count, associated with a particular object in the object list of the particular user-based storage site, is less than a threshold amount; and
   transmit a message requesting a quantity of the particular object to supply to the object list of the particular user-based storage site.

20. The non-transitory computer-readable medium of claim 13, wherein the one or more instructions, when executed by the one or more processors, further cause the device to:
   receive, from a user device associated with the corresponding user, object data indicating a used object; and
   update the object list with the used object.

* * * * *